(12) United States Patent
Molenaar et al.

(10) Patent No.: US 7,380,469 B2
(45) Date of Patent: Jun. 3, 2008

(54) ULTRASONIC FLOW RATE MEASURING DEVICE

(75) Inventors: Marcel Meijlom Molenaar, Dordrecht (NL); Jan Teunis Aart Pors, Oud-Beijerland (NL); Arie Huijzer, Sliedrecht (NL)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 11/684,960

(22) Filed: Mar. 12, 2007

(65) Prior Publication Data

US 2007/0227261 A1  Oct. 4, 2007

(30) Foreign Application Priority Data

Mar. 30, 2006  (DE) ...................... 10 2006 015 218

(51) Int. Cl.
*G01F 1/66* (2006.01)
(52) U.S. Cl. .................................................. 73/861.27
(58) Field of Classification Search ............ 73/861.27, 73/643, 159; 381/191
See application file for complete search history.

(56) References Cited

U.S. PATENT DOCUMENTS

| 4,948,552 | A  |   | 8/1990 | Mollot et al. |
|-----------|----|---|--------|---------------|
| 5,866,820 | A  | * | 2/1999 | Camplin et al. .............. 73/643 |
| 6,085,592 | A  | * | 7/2000 | Kawashima ................. 73/632 |
| 6,532,827 | B1 |   | 3/2003 | Ohnishi |
| 6,615,674 | B2 |   | 9/2003 | Ohnishi |
| 6,771,785 | B2 | * | 8/2004 | Pompei ...................... 381/191 |

* cited by examiner

*Primary Examiner*—Jewel V Thompson
(74) *Attorney, Agent, or Firm*—David S. Safran

(57) ABSTRACT

An ultrasonic flow rate measuring device, especially a clamp-on ultrasonic flow rate measuring device, with at least one ultrasonic transducer (8) for measuring the flow rate through a line through which a medium flows. The ultrasonic transducer (8) is located within an electromagnetic shielding arrangement (6). Thus, an ultrasonic flow rate measuring device which delivers a good signal-to-noise ratio is achieved.

13 Claims, 3 Drawing Sheets

ULTRASONIC FLOW RATE MEASURING DEVICE

BACKGROUND OF THE INVENTION

1. Field of the Invention

The invention relates to an ultrasonic flow rate measuring device, especially a clamp-on ultrasonic flow rate measuring device, for measuring the flow rate through a line through which a medium flows, with at least one ultrasonic transducer.

2. Description of Related Art

Clamp-on ultrasonic flow rate measuring devices are characterized in that they can be used especially easily. In contrast to other ultrasonic flow rate measuring devices which must be permanently integrated into the existing pipeline system by the device replacing a piece of the pipeline, clamp-on flow rate measuring devices can simply be placed from the outside on a suitable line section of the piping system. The line section to which the clamp-on ultrasonic flow rate measuring device is attached thus becomes more or less a measuring line without the need for its own separate measuring line which must be inserted into the piping system with great effort. This makes the use of clamp-on ultrasonic flow rate measuring devices simple and economical.

However, the problem in clamp-on ultrasonic flow rate measuring devices, as in other ultrasonic flow rate measuring devices, is often that the attainable signals are only very small. This can be attributed, for example, to low operating voltages due to the circuits which are made inherently safe. Moreover, the signal-to-noise ratio is also degraded by unmatched acoustic transitions between different materials. Finally, on the signal path, signal losses due to attenuation effects occur in the respective medium. This is often associated with a very small measurement signal which is output by the receiving ultrasonic transducer. Such a small measurement signal is, at this point, especially susceptible to electromagnetic noise.

SUMMARY OF THE INVENTION

Thus, a primary object of the invention is to devise an ultrasonic flow rate measuring device, especially a clamp-on ultrasonic flow rate measuring device, which delivers a signal with a good signal-to-noise ratio.

Proceeding from the initially described ultrasonic flow rate measuring device, this object is achieved in that the ultrasonic transducer is located within an electromagnetic shielding means.

Therefore, in accordance with the invention, it is provided that measures are taken to ensure that the ultrasonic transducer is not exposed to electromagnetic noise. If electromagnetic noise cannot be coupled into the lines and components, such as electronic components, of the ultrasonic transducer, it is possible by means of, for example, a shielded line to decouple the signal which has been output by the receiving ultrasonic transducer at least essentially free of external interference.

Basically, within the framework of the invention, different shielding means are possible. According to one preferred development of the invention, it is provided that the shielding means is formed by a metallic or at least metallically coated housing. According to another preferred development of the invention, it is provided that, for electrical connection of the ultrasonic transducer, there is a cable with shielding and the cable shielding is metallically and conductively connected to the shielding means. Thus, the above described advantage is achieved that the measurement signal which has been output by the ultrasonic transducer can be output more or less free of external interference.

The approach in accordance with the invention that the ultrasonic transducer is located within an electromagnetic shielding means can be used fundamentally for any ultrasonic flow rate measuring device. However, according to a preferred development of the invention, it is provided that the ultrasonic flow rate measuring device has a ultrasonic transducer with a piezo element, there is a connecting element for attaching the ultrasonic transducer to the line, the piezo element is attached to the connecting element, and between the piezo element and the connecting element, there is an intermediate plate which is formed by a part of the metallically or at least metallically coated housing.

In particular, by providing the intermediate plate under consideration, other advantages can be achieved. Specifically, optimum adaptation of the transition of the ultrasonic signals from the piezo element to the connecting element by the corresponding geometrical configuration and adaptation of the intermediate plate can be obtain as is explained in detail below.

Basically, the intermediate plate can follow different geometries. According to one preferred development of the invention, it is provided that the top and bottom of the intermediate plate run parallel to one another. In this way, the ultrasonic signals running through the intermediate plate are subjected to the least possible influences by the geometry of the intermediate plate.

Basically, the piezo element can be electrically connected in different ways. According to one preferred development of the invention, it is provided that the intermediate plate is used as an electrical connection for the piezo element. For this purpose, the intermediate plate with a metallic portion can be in direct physical, metallically conductive contact with the piezo element. In particular, in this connection, it is provided that the piezo element rests flat on the intermediate plate or parts of the intermediate plate.

Furthermore, according to a preferred development of the invention, it is provided that the piezo element is attached to the connecting element by means of the intermediate plate. In this respect, according to a preferred development of the invention, it can be provided that the intermediate plate has at least one recess in which there is a layer of adhesive for attachment of the piezo element to the connecting element. This means, in other words, that the piezo element is cemented onto the connecting element, specifically by means of the layer of adhesive provided in the recess of the intermediate plate.

In this respect, according to a preferred development of the invention, it is also provided that the thickness of the layer of adhesive corresponds to the thickness of the intermediate plate. Finally, according to a preferred development, it is provided that the instrument transformer is intended for operation with a predetermined ultrasonic frequency and the thickness of the intermediate plate corresponds to one fourth of the ultrasonic wavelength in the layer of adhesive at a predetermined ultrasonic frequency. In this way, optimum adaptation which ensures the lowest losses is likewise achieved. For the layer of adhesive, there can be an electrically conductive cement so that electrical contact-making of the piezo element need not necessarily take place via the intermediate plate.

According to a preferred development of the invention, it is provided that the intermediate plate is preferably completely metallic, at least on the side facing the piezo element.

This metallic execution of the intermediate plate is also necessary for the above described function of the intermediate plate as an electrical connection for the piezo element.

The electrical connection of the piezo element on its side opposite the intermediate plate can be made in different ways. According to a preferred development of the invention, it is provided that the piezo element, on its side opposite the intermediate plate, has a terminal spring adjoining the piezo element as the electrical connection. Thus, an especially simple and reliable electrical contact-making of the piezo element is achieved.

Basically, the piezo element can be attached freely on the connecting element. According to a preferred development of the invention it is provided that the connecting element has positioning means for the piezo element. In particular, in this connection, it can be provided that the connecting element, as a positioning means, has walls or pins which project from the connecting element, within which an exactly defined positioning site for the piezo element is determined.

Finally, the connecting element can be made from various materials and can follow different geometries. However, according to a preferred development of the invention, it is provided that the connecting element is a wedge that is preferably made of plastic.

One preferred embodiment of the invention is explained in detail below with reference to the accompanying drawings.

DETAILED DESCRIPTION OF THE INVENTION

For an ultrasonic flow rate measuring device according to a preferred embodiment of the invention, the part relevant here, specifically the entire ultrasonic transducer means including the connecting element and housing, is described below.

Figure 3:
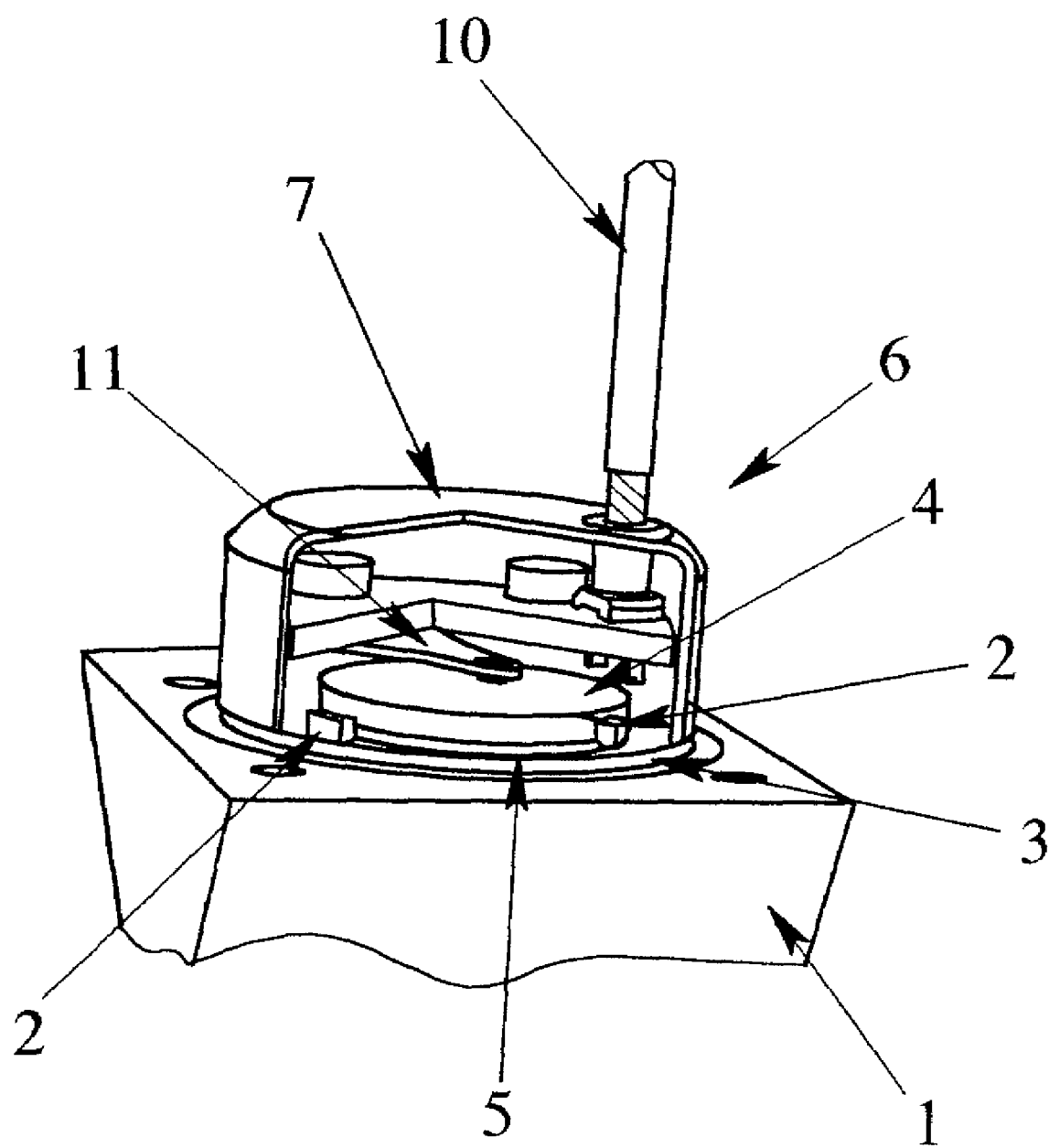
FIG. 3 shows a second section of the ultrasonic transducer means of an ultrasonic flow rate measuring device according to a preferred embodiment of the invention.

All components of the ultrasonic transducer unit are shown in the exploded view in FIG. 3. The ultrasonic transducer unit has a connecting element 1 in the form of a plastic wedge via which there takes place the actual connection of the ultrasonic transducer unit to the flow line (which is not further shown} through which the medium flows with a flow rate which is to be measured. The connecting element 1 has a positioning means 2 in the form of projecting wall sections which are used as a positioning aid for a metallic intermediate plate 3 and a piezo element 4.

Figure 1:
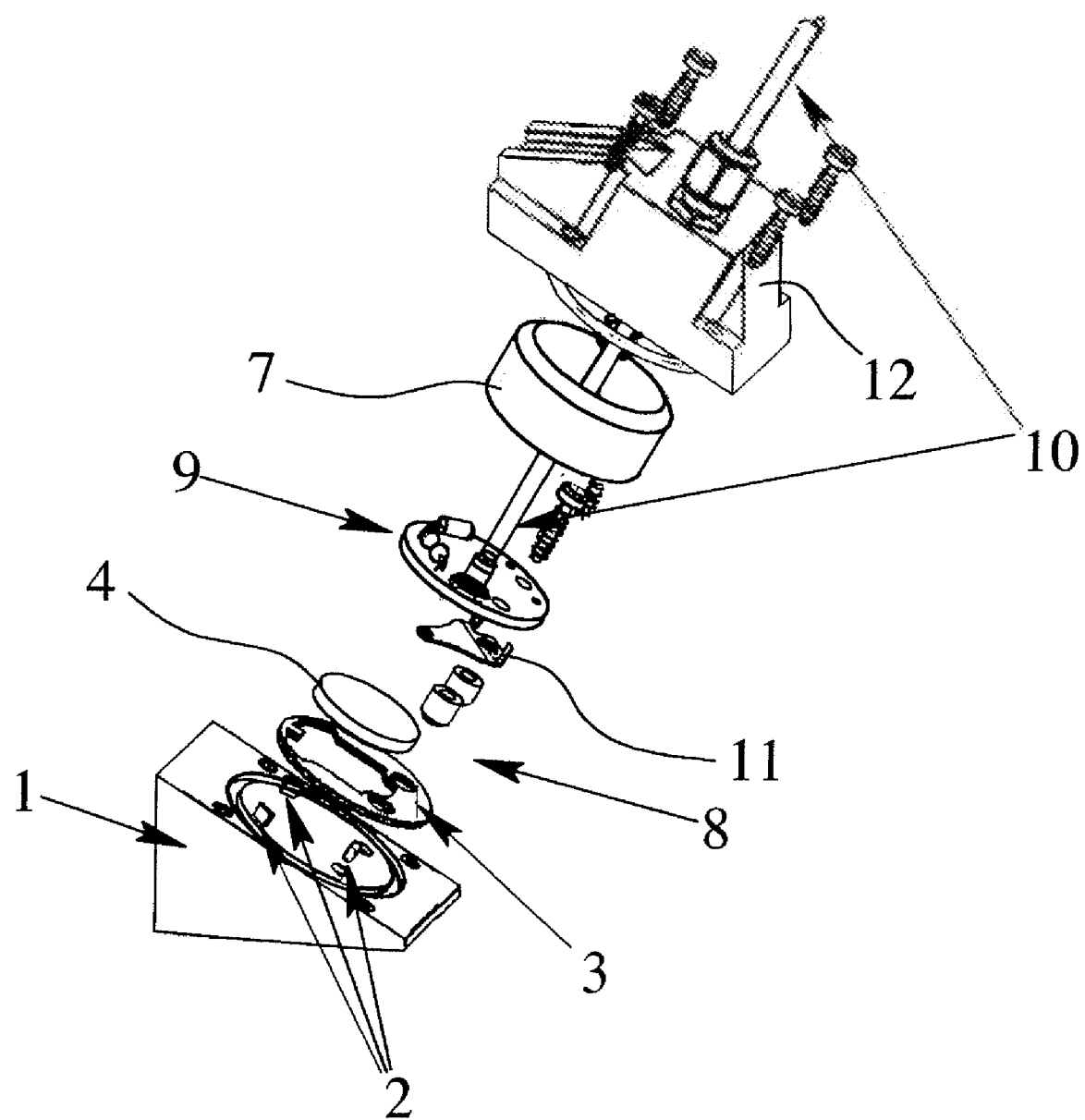
FIG. 1 is an exploded view of the entire ultrasonic transducer means of an ultrasonic flow rate measuring device according to a preferred embodiment of the invention.
Figure 2:
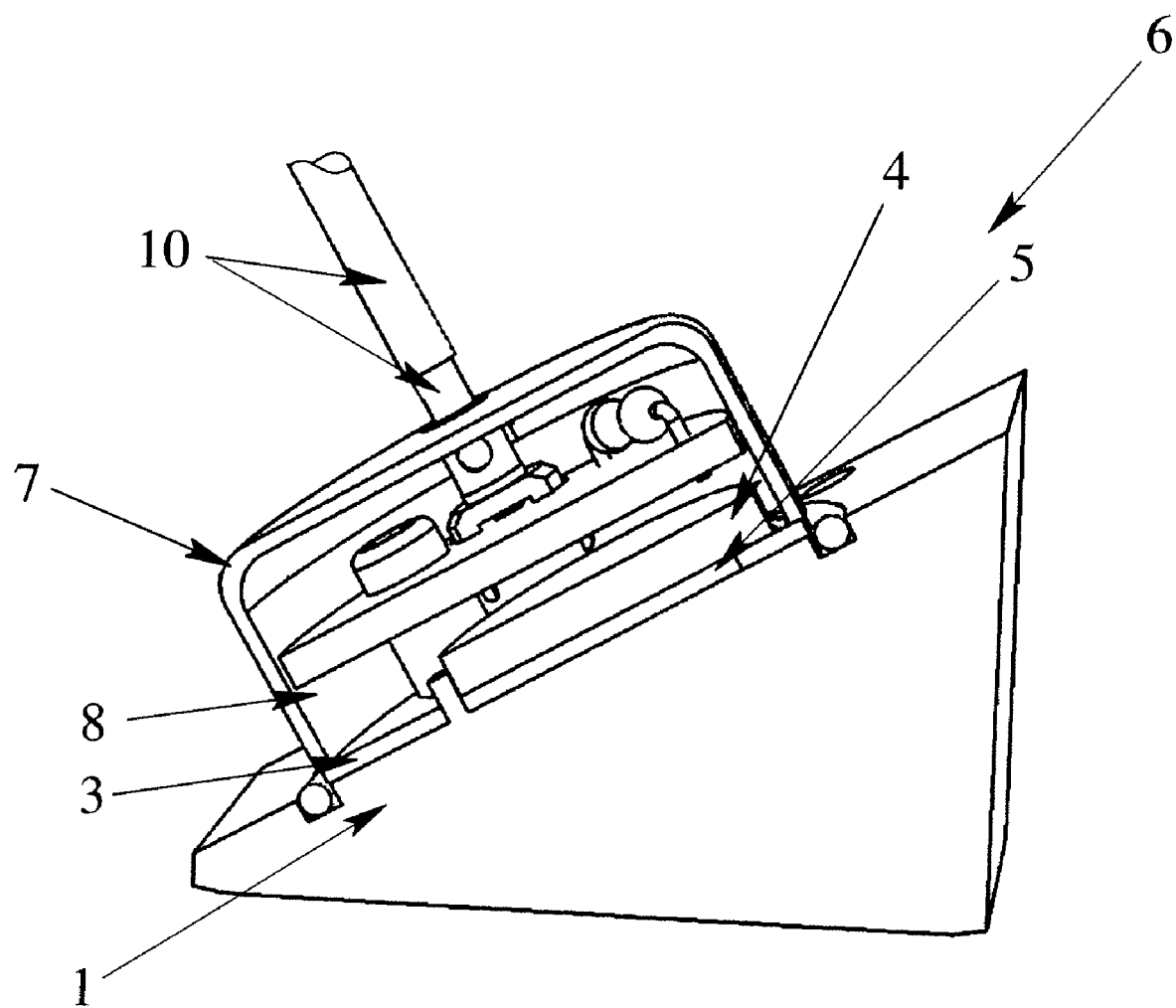
FIG. 2 shows a first section of the ultrasonic transducer means of an ultrasonic flow rate measuring device according to the preferred embodiment of the invention.

An opening is provided on an inside region of the intermediate plate 3 so that there is a space which can be filled with a layer 5 of adhesive when the intermediate plate 3 rests on the connecting element 1, as is apparent, for example, from FIGS. 2 & 3. The layer 5 of adhesive can be a single-component or bi-component electrically conductive epoxy cement. As is also apparent from FIGS. 2 & 3, the intermediate plate 3 is made such that the piezo element 4 rests not only on the layer 5 of adhesive, but also on parts of the intermediate plate 3.

In the preferred embodiment of the invention described here, for shielding of electromagnetic noise, there is an electromagnetic shielding means 6 which is composed of the intermediate plate 3 and the housing 7 of metal. The housing 7 rests on the intermediate plate 3 so that a closed, shielded space results within which the ultrasonic transducer, including the piezo element 4 and other electronic means 9, are provided.

For electrical connection of the piezo element 4, the following is provided. The electrical connection of the ultrasonic transducer unit takes place via a coaxial cable 10 with shielding connected to the electromagnetic shielding means 6, specifically the housing 7, and its core is routed to a terminal spring 11 which is provided on the side of the piezo element 4 opposite the intermediate plate 3. Because the piezo element 4 rests on the intermediate plate 3 in a galvanically conductive manner and the shielding of the coaxial cable 10 is connected to the housing 7 which lies on the intermediate plate 3, grounding of the piezo element on the side opposite the terminal spring 11 takes place.

All components are finally protected by a plastic housing 12 which is screwed onto the connecting element 1. Altogether, the result is that the measurement signal which has been output by the ultrasonic transducer 8 is more or less free of external interference.

It is also important here that the thickness of the layer 5 of adhesive corresponds to the thickness of the intermediate plate 3. In this connection, the instrument transformer means is designed for operation with a predetermined ultrasonic frequency so that the thickness of the intermediate plate 3 can be selected such that it corresponds to one fourth of the ultrasonic wavelength in the layer 5 of adhesive at a predetermined ultrasonic frequency. Thus, the advantage of optimum adaptation of the transition of the ultrasonic signals from the piezo element 4 to the connecting element 11 is achieved.

What is claimed is:

1. Ultrasonic flow rate measuring device for measuring the flow rate of a medium flowing through a line, comprising:
   at least one ultrasonic transducer, and
   means for electromagnetic shielding said at least one ultrasonic transducer, the at least one ultrasonic transducer being enclosed with said means for electromagnetic shielding wherein the electromagnetic shielding means comprises an at least metallically coated housing that encloses said ultrasonic transducer.

2. Ultrasonic flow rate measuring device in accordance with claim 1, further comprising a cable with electromagnetic shielding for electrical connection of the at least one ultrasonic transducer with shielding of the electromagnetic shielding means, the electromagnetic shielding of the cable being metallically and conductively connected to the means for electromagnetic shielding.

3. Ultrasonic flow rate measuring device in accordance with claim 1, wherein the ultrasonic transducer has a piezo element, wherein a connecting element is provided for attaching the ultrasonic transducer to the line, the piezo element being attached to the connecting element, and wherein an intermediate plate is located between the piezo element and the connecting element, the intermediate plate being formed by a part of the at least metallically coated housing.

4. Ultrasonic flow rate measuring device in accordance with claim 3, wherein top and bottom sides of the intermediate plate are parallel to one another.

5. Ultrasonic flow rate measuring device in accordance with claim 3, wherein the intermediate plate provides an electrical connection for the piezo element.

6. Ultrasonic flow rate measuring device in accordance with claim 3, wherein the piezo element is attached to the connecting element by means of the intermediate plate.

7. Ultrasonic flow rate measuring device in accordance with claim 3, wherein the intermediate plate has at least one recess in which there is a layer of adhesive for attachment of the piezo element to the connecting element.

8. Ultrasonic flow rate measuring device in accordance with claim 7, wherein the layer of adhesive has a thickness which corresponds to the thickness of the intermediate plate.

9. Ultrasonic flow rate measuring device in accordance with claim 8, wherein the ultrasonic transducer operates with a predetermined ultrasonic frequency and the thickness of the intermediate plate corresponds to one fourth of the ultrasonic wavelength in the layer of adhesive at the predetermined ultrasonic frequency.

10. Ultrasonic flow rate measuring device in accordance with claim 3, wherein the intermediate plate is completely metallic at least on a side facing the piezo element.

11. Ultrasonic flow rate measuring device in accordance with claim 3, wherein the piezo element on a side opposite the intermediate plate has a terminal spring adjoining the piezo element as an electrical connection.

12. Ultrasonic flow rate measuring device in accordance with claim 3, wherein the connecting element has positioning means for the piezo element.

13. Ultrasonic flow rate measuring device in accordance with claim 3, wherein the connecting element is a wedge made of plastic.

* * * * *